(12) United States Patent
Saito et al.

(10) Patent No.: US 8,215,160 B2
(45) Date of Patent: Jul. 10, 2012

(54) SENSOR STRUCTURE

(75) Inventors: Takayuki Saito, Hitachinaka (JP);
Chihiro Kobayashi, Naka (JP);
Takayuki Yogo, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 128 days.

(21) Appl. No.: 12/826,061

(22) Filed: Jun. 29, 2010

(65) Prior Publication Data

US 2011/0072894 A1   Mar. 31, 2011

(30) Foreign Application Priority Data

Sep. 30, 2009  (JP) ................................. 2009-225932

(51) Int. Cl.
*G01M 15/04* (2006.01)
(52) U.S. Cl. .................. 73/114.34; 73/114.37
(58) Field of Classification Search ............... 73/114.31, 73/114.32, 114.34, 114.37
See application file for complete search history.

(56) References Cited

U.S. PATENT DOCUMENTS

| | | | |
|---|---|---|---|
| 6,012,432 A | 1/2000 | Igarashi et al. | |
| 6,581,447 B1 * | 6/2003 | Strohrmann et al. | 73/114.32 |
| 7,520,051 B2 * | 4/2009 | Becke et al. | 29/832 |
| 2008/0163683 A1 | 7/2008 | Becke et al. | |
| 2008/0302173 A1 | 12/2008 | Saito et al. | |
| 2010/0031737 A1 | 2/2010 | Saito et al. | |

FOREIGN PATENT DOCUMENTS

| | | |
|---|---|---|
| EP | 1 128 168 A2 | 8/2001 |
| EP | 2 154 494 A1 | 2/2010 |
| JP | 10-197305 A | 7/1998 |
| JP | 3523022 B2 | 2/2004 |
| JP | 2008-304232 A | 12/2008 |

OTHER PUBLICATIONS

Corresponding European Search Report dated Feb. 4, 2011 (Three (3) pages).

\* cited by examiner

*Primary Examiner* — Freddie Kirkland, III
(74) *Attorney, Agent, or Firm* — Crowell & Moring LLP (57) ABSTRACT

The present invention utilizes self-heating of electronic components to improve a humidity sensing part with low environment resistance, such as a condensation problem and the like, and also to enhance the heat radiation efficiency of electronic components. The humidity sensing part is used in an intake tube of an automobile by integrating, for example, with a heating resister type mass air flow measurement device. A humidity sensing element is mounted on an electronic circuit board in a mass air flow measurement device with the temperature thereof starting to increase immediately after a sensor has been actuated. This urges the temperature of the humidity sensing element to start increasing (being heated) immediately after the sensor has been actuated. To urge the humidity sensing element to be further heated, a base plate is composed of two types of materials, resin and metal. A part of the base plate holding an area of the electronic circuit board generating a large quantity of heat is composed of the metal. A part of the base plate corresponding to the periphery of the humidity sensing part which is to be heated is composed of the resin.

5 Claims, 9 Drawing Sheets

SENSOR STRUCTURE

BACKGROUND OF THE INVENTION

1. Field of the Invention

The present invention relates to a sensor integrated structure suitable for physical quantity measurements relating to intake air in an internal combustion engine, and an internal combustion engine control device that uses the sensor integrated structure.

2. Background Art

A heating resistor type mass air flow measurement device is known as a flow measuring technique for internal combustion engines (see JP Patent No. 3523022). The heating resistor type mass air flow measurement device utilizes the correlation of the quantity of heat taken from a heating resistor with inflow discharge. The heating resistor type mass air flow measurement device is capable of directly measuring mass flow required to control combustion in an engine and is thus widely used as a flowmeter for air-fuel ratio control particularly in an automobile.

In connection with a sensor including a flow measurement device, a pressure sensing device, a humidity sensing device, and the like for internal combustion engines which are integrated together, the sensor being capable of measuring a plurality of physical quantities, JP Patent Publication (Kokai) No. 2008-304232A discloses, as a well-known technique, an example in which an air flow sensor, a humidity sensor, and a pressure sensor are integrated together.

SUMMARY OF THE INVENTION

In recent years, cars that use an electronically-controlled fuel injection system have been common. In this case, an engine room is internally crammed with various sensors and control devices. Furthermore, in that case a wire harness that interconnects various sensors and control devices as well as a control unit configured to control the sensors and control instruments is complicatedly intricate.

Thus, there has been a demand to reduce the number of components and improve the appearance of the interior of the engine room by integrating the plurality of sensors and control instruments together. For example, in a certain measure, the above-described heating resistor type mass air flow measurement device is integrated with a temperature sensing device and even a semiconductor pressure sensing device, a humidity sensing device, and the like to allow connectors to be shared. This enables a reduction in the number of steps required to assemble components together into a vehicle and simplification of the wire harness.

In conventionally mainstream structures, the heating resistor type mass air flow measurement device is integrated with a temperature sensing device. However, as heating resistor type mass air flow measurement devices are integrated with the above-described pressure sensing device and humidity sensing device in the future, various technical problems are expected to occur.

In particular, the humidity sensing device described above has not been utilized for fuel control applications yet but has mainly been used to control air conditioning in the vehicle interior. Applications to the vehicle interior involve no demand for high durability based on an envisioned harsh environment. However, when integrated with, for example, the heating resistor type mass air flow measurement device or other sensors in order to control the engine, the humidity sensing device needs to offer environment resistance equivalent to that of the heating resistor type mass air flow measurement device. An environment particularly unfavorable to the humidity sensing device is condensation in a sensing element part thereof. Thus, a definite technical solution to this problem is essential.

For example, if condensation occurs in the humidity sensing element, the humidity sensing element may output a signal value indicative of the maximum or minimum humidity depending on the configuration of the sensor or a peripheral circuit therefor, temporarily preventing the humidity sensing device from fulfilling its functions as a humidity sensing device until the sensing element part is dried. In this case, during the period in which the humidity sensing device is prevented from fulfilling its functions, the engine control system may be affected. On the other hand, the multiplexed sensor may disadvantageously increase the total current consumption of the sensor.

An object of the present invention is to provide a sensor structure suitable for integration of the humidity sensing device and even the pressure sensing device with the mass air flow measurement device.

To deal with the above-described problem, the present inventors have focused on the heat generation and radiation structure of the sensor itself in the mass air flow measurement device, which consumes the largest amount of current among the integrated sensors. A power transistor or the like which controls the quantity of heat applied to the mass air flow sensing element generates a large quantity of heat. If heat is not efficiently radiated from the power transistor, the temperature of the device as a whole increases. Then, electronic components and resistors with different temperature characteristics may contribute to reducing the accuracy at which the mass air flow is detected. This thermal effect may further affect, for example, the durability of the electronic components. Accordingly, an efficient heat radiation structure for the mass air flow measurement device has been sought. Thus, a base plate on which an electronic circuit board is adhesively held is preferably composed of metal. This configuration enables heat radiation based on the transfer of heat from the base plate to air flowing through a main air flow passage.

On the other hand, the humidity sensing device needs to deal with the above-described condensation. The humidity sensing device requires, for example, means for drying the humidity sensing element subjected to condensation in a short time and means for keeping the surface of the humidity sensing element dry in wet air. To achieve this, the humidity sensing element itself may be maintained at high temperature. It is effective to heat the humidity sensing element part and the periphery thereof and to store heat in the humidity sensing element part and the periphery thereof.

The heat radiation function and the heating function, which are contradictory to each other, are achieved by one device.

A possible condensation environment corresponds to the cold start of an engine in a time zone from night till morning when the temperature is low. Hence, it is important to remove condensed dew in an environment in which the mass air flow in an intake tube is very low during engine start, particularly during idling. To achieve this, the humility sensing element is mounted on the electronic circuit board in the mass air flow measurement device with the temperature thereof starting to increase immediately after the sensor has been actuated. This facilitates an increase of the temperature of the humidity sensing element immediately after the sensor has been actuated.

The humidity sensing element and a part of the circuit board surrounding the humidity sensing element are exposed to air flowing through a second bypass channel and thus radiate a slight quantity of heat. However, an intended idle flow rate offers a low flow velocity, and a "received heat>radiated heat" relationship is thus established in the humidity sensing element part. This effect is higher when the relationship between the flow velocity of air flowing through a bypass air passage and the flow velocity of air flowing through the second bypass channel is such that the flow velocity in the bypass air passage is greater than the flow velocity in the second bypass channel.

Furthermore, to facilitate heating of the humidity sensing element, the base plate is composed of two types of materials, resin and metal. The material of the base plate holding an area where the electronic circuit board generates a large quantity of heat is composed of the metal. A part of the base plate holding the periphery of the second bypass channel, which is to be heated, is composed of the resin. This further facilitates heating of the humidity sensing element.

In contrast, in an environment in which the sensors are unlikely to be affected by condensation, at least a given amount of air flows through the humidity sensing element part. This corresponds to, for example, an operational environment in which the flow rate in the intake tube reaches a medium or high flow rate zone. In this case, condensed dew does not need to be removed but heat radiation from the electronic circuit board is preferably enhanced. In this operational environment, a sufficient airflow is generated in the second bypass channel, enabling heat to be radiated from the electronic circuit board through the second bypass channel part. Accordingly, the heat radiation effect of the electronic circuit board, in combination with heat radiation effect from the base plate is enhanced.

The above-described configuration allows the device to provide both the heat generation function and the heat radiation function, which are contradictory to each other.

Heat generated by the mass air flow measurement device is effectively utilized to remove condensed dew in the humidity sensing part. This eliminates the need to additionally provide a heater function around the humidity sensing part. Alternatively, condensed dew can be removed without the use of the heater function of the humidity sensing element. This enables accurate sensing of the humidity and a reduction in the total power consumption of the sensor.

Moreover, the improved efficiency of heat radiation, which is a capability contradictory to heat generation, serves to suppress the self-heating of the sensor, thus improving the durability of electronic components. This also reduces the adverse effects of the temperature characteristics of the electronic components or print resistors, thereby enabling other physical quantities to be accurately measured.

According to the present invention, the vehicle can be provided, over a long period, with accurate fuel control that is essential for dealing with both exhaust gas and fuel consumption regulations.

DESCRIPTION OF SYMBOLS

1 Heating resistor
2 Air temp compensation resistor
3 Intake air temperature sensor
50 Air cleaner
51 Intake air
52 Flow tube mass air flow sensor installed
53 Intake air duct
54 Throttle body
55 Fuel injector
56 Intake manifold
57 Engine cylinder
58 Exhaust gas
59 Exhaust manifold
60 Integrated bypass channel type mass air flow sensor module
61 Throttle angle sensor
62 Oxygen meter
63 Engine speed meter
64 Engine control unit
65 Idle air control valve
100 Main air flow passage
101 Air flow tube
102 Sensor installation opening
200 Heating resistor type mass air flow measurement device
201 Housing structural part
202 Base plate
203 Electronic circuit board
204 Cover
205 Bypass air passage
206 Bypass channel
207 Seal material
208 Bonding material
209 Connector terminal
210 Air induction opening
211 Second bypass channel
212 Second bypass inlet
213 Second bypass outlet
500 Humidity sensing part
600 Pressure sensing part
601 Pressure intake hole
602 Pressure measurement I/O terminals

DETAILED DESCRIPTION OF THE PREFERRED EMBODIMENTS

Figure 1:
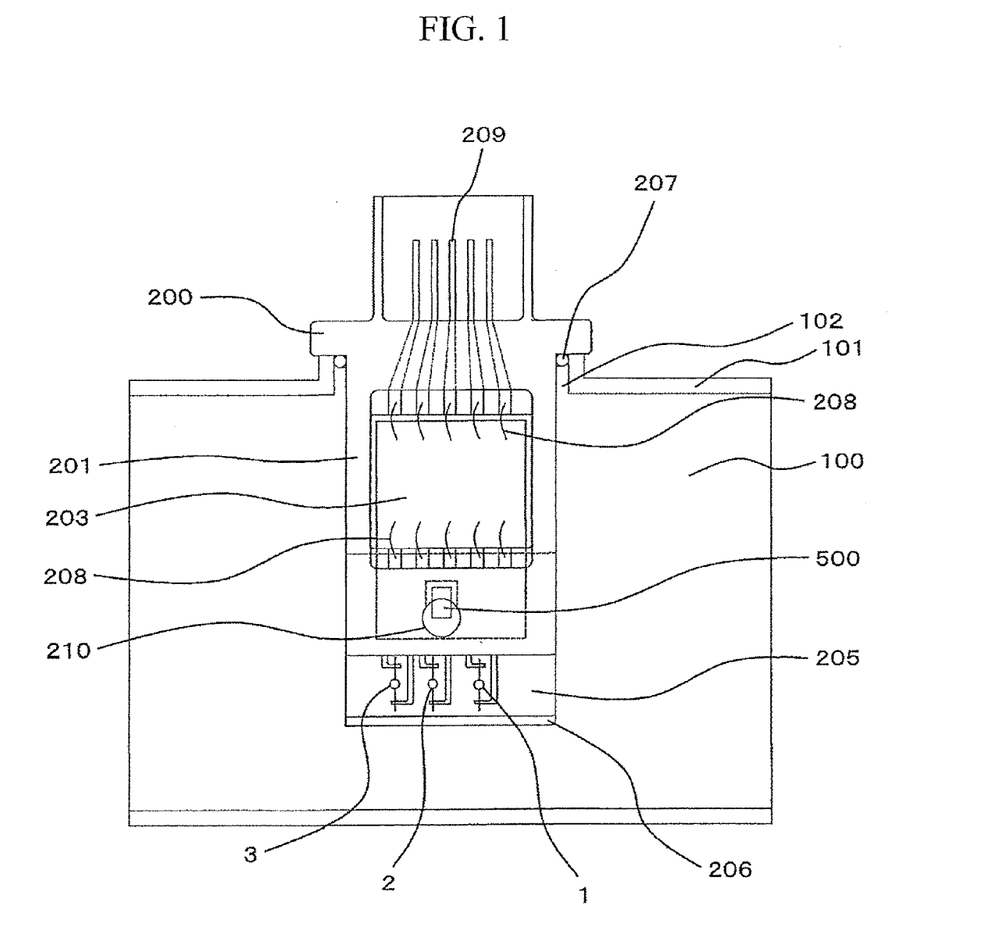
FIG. 1 is a diagram of a sensor structure showing an embodiment of the present invention.
Figure 2:
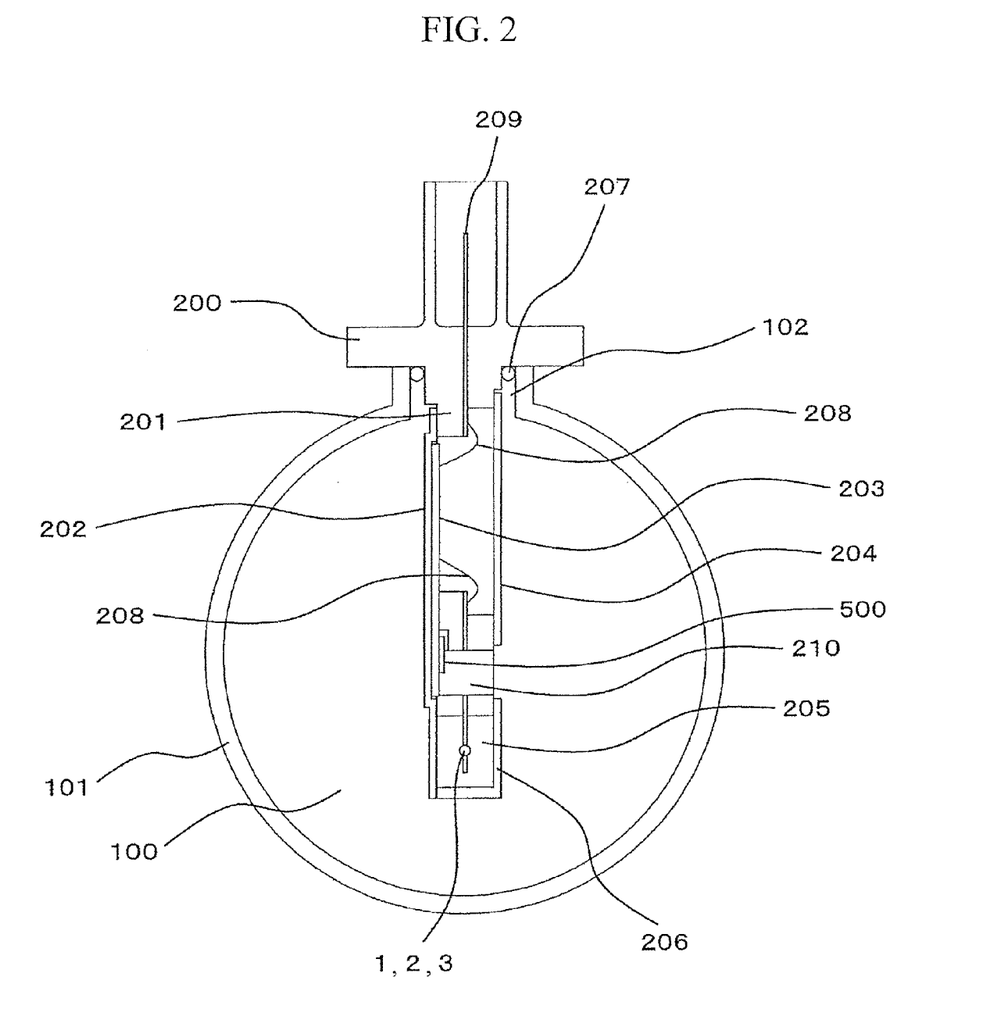
FIG. 2 is a diagram of the sensor structure in FIG. 1 as seen from the front of the structure.

A specific example of a configuration according to the present invention will be described with reference to FIG. 1. FIG. 2 is a diagram of the configuration in FIG. 1 as seen from the front of the configuration.

An air flow tube (intake line structural part) 101 forming a main air flow passage (hereinafter also referred to as an intake line or simply an intake tube) 100 includes a sensor installation opening 102 formed in a part of the air flow tube 101 and through which a part of a heating resistor type mass air flow measurement device 200 is inserted. The heating resistor type mass air flow measurement device 200 into which a humidity sensing part 500 is integrated is installed in the air flow tube 101.

The heating resistor type mass air flow measurement device 200 includes not only a housing structural part 201 but also a base plate 202, a cover 204 configured to protect, an electronic circuit board 203, a heating resistor 1 configured to measure mass air flow, an air temp compensation resistor 2 used to measure the mass air flow, an intake air temperature sensor 3 used on the vehicle side, a bypass air passage 205 in which the heating resistor 1, the air temp compensation resistor 2, and the like are installed, a bypass channel 206 for forming the bypass air passage 205, and a seal material 207 configured to seal the main air flow passage 101 from the exterior. The heating resistor 1, air temp compensation resistor 2, and intake air temperature sensor 3, each configured to sense intake mass air flow or intake air temperature, are connected to the electronic circuit board 203 via a bonding material 208. Moreover, the electronic circuit board 203 is similarly electrically connected to a connector terminal 209 via the bonding material 208 so as to receive and output data from and to an external device via the connector terminal 209.

A humidity sensing part 500 is installed on the electronic circuit board 203 configured to drive the heating resistor type mass air flow measurement device 200. The housing structural part 201 includes an air induction opening 210 so as to allow the humidity sensing part 500 to directly contact intake air. A humidity signal sensed by the humidity sensing part 500 is transmitted to the external device using the connector terminal 209.

In this configuration, when the heating resistor type mass air flow measurement device 200 is actuated, the electronic circuit board 203 starts generating heat without delay. The resultant thermal effect propagates to the humidity sensing part 500. As a result, even if the humidity sensing part 500 has disadvantageously been subjected to condensation at the time of the actuation thereof, the humidity sensing part 500 can be recovered to a normal condition in a short time.

Furthermore, for example, provided that the humidity sensing part 500 has the function of detecting relative humidity and temperature, the resultant humidity signal can be processed and utilized as an absolute humidity to accomplish the purpose while preventing heat received from the electronic circuit board 203 from affecting measurement results.

Figure 3:
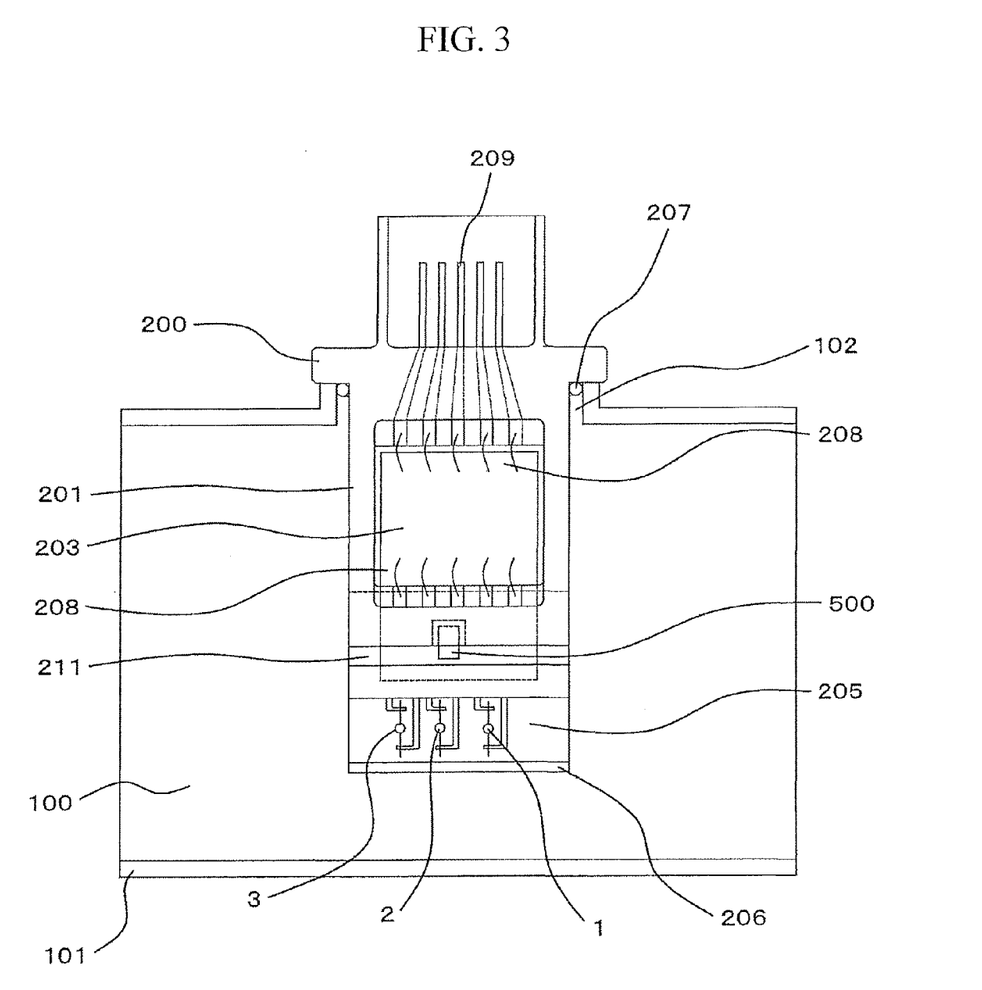
FIG. 3 is a diagram of a sensor structure showing another embodiment of the present invention.

FIG. 3 shows an example in which the humidity sensing part 500 is mounted inside a second bypass channel 211.

In this configuration, besides the bypass air passage 205 used for the heating resistor type mass air flow measurement device 200, the second bypass channel 211 is installed to take in part of air flowing through the main air flow passage 100.

In this configuration, when the heating resistor type mass air flow measurement device 200 is actuated, the electronic circuit board 203 starts generating heat without delay. The resultant thermal effect propagates to the humidity sensing part 500. As a result, even if the humidity sensing part 500 has disadvantageously been subjected to condensation at the time of the actuation thereof, the humidity sensing part 500 can be recovered to a normal condition in a short time. This is effective for removing condensed dew in an environment in which only a small amount of air can be taken in during the cold start of the engine, when condensation is likely to occur, particularly during idling.

In contrast, in an environment in which the sensor is unlikely to be affected by condensation, the heat radiation efficiency of the electronic circuit board 203 is preferably enhanced. Thus, in the present configuration, in a high flow rate zone in which the electronic circuit board 203 generates the largest quantity of heat, a sufficient airflow is also generated in the second bypass channel. This enables heat to be radiated from the electronic circuit board 203 through the second bypass channel 211. The heat radiation from the electronic circuit board 203, in combination with heat radiation from the base plate 202, enhances the heat radiation effect. The above-described configuration allows the device to provide both the heat generation function and the heat radiation function, which are contradictory to each other.

Figure 4:
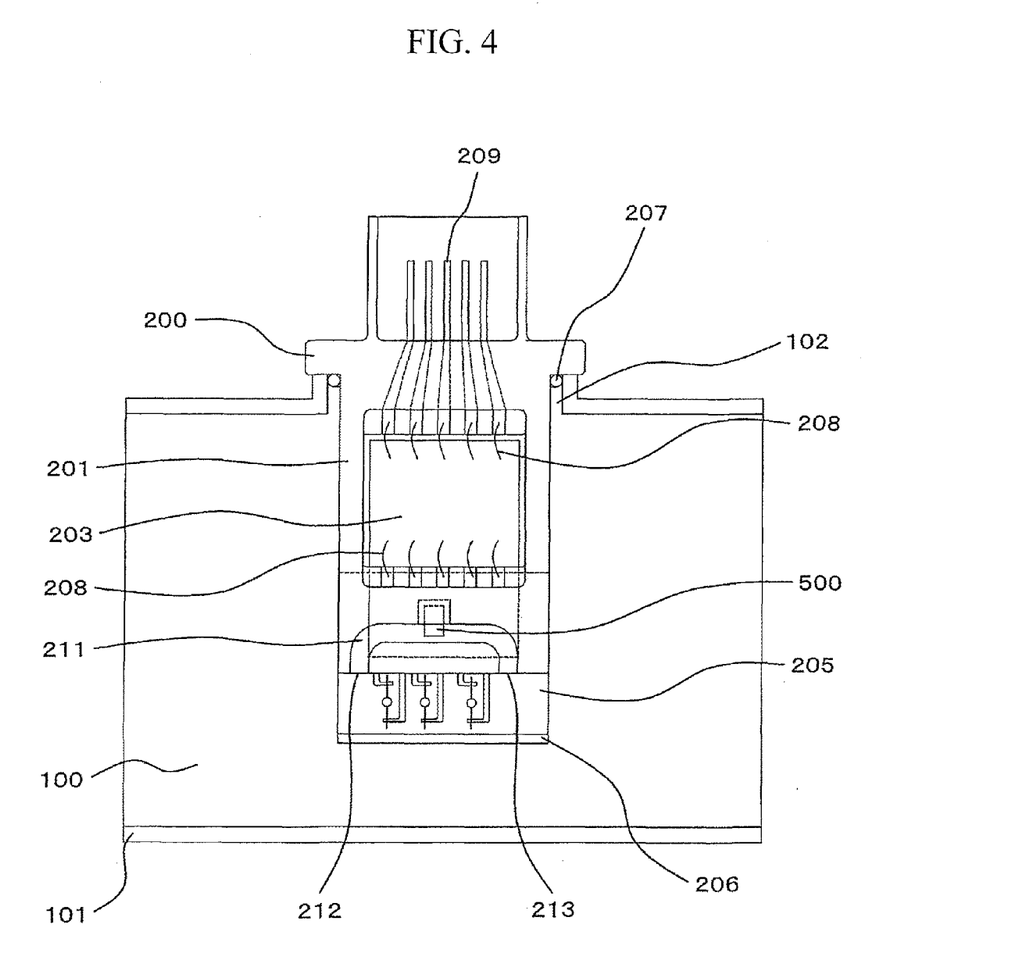
FIG. 4 is a diagram of a sensor structure showing yet another embodiment of the present invention.

FIG. 4 shows an example in which the second bypass channel 211 is rearranged.

The second bypass channel 211 is configured to bypass the bypass air passage 205. The humidity sensing part 500 is mounted in the second bypass channel 211. A second bypass inlet 212 and a second bypass outlet 213 are open in a bypass air passage 205 in a horizontal direction with respect to the direction in which air flows through the bypass air passage 205. This configuration allows contaminants such as dust and oil which float in the intake air not to be easily taken into the second bypass channel 211 with the humidity sensing part 500 mounted therein. Thus, the possible contamination of the humidity sensing part 500 can be avoided.

Figure 5:
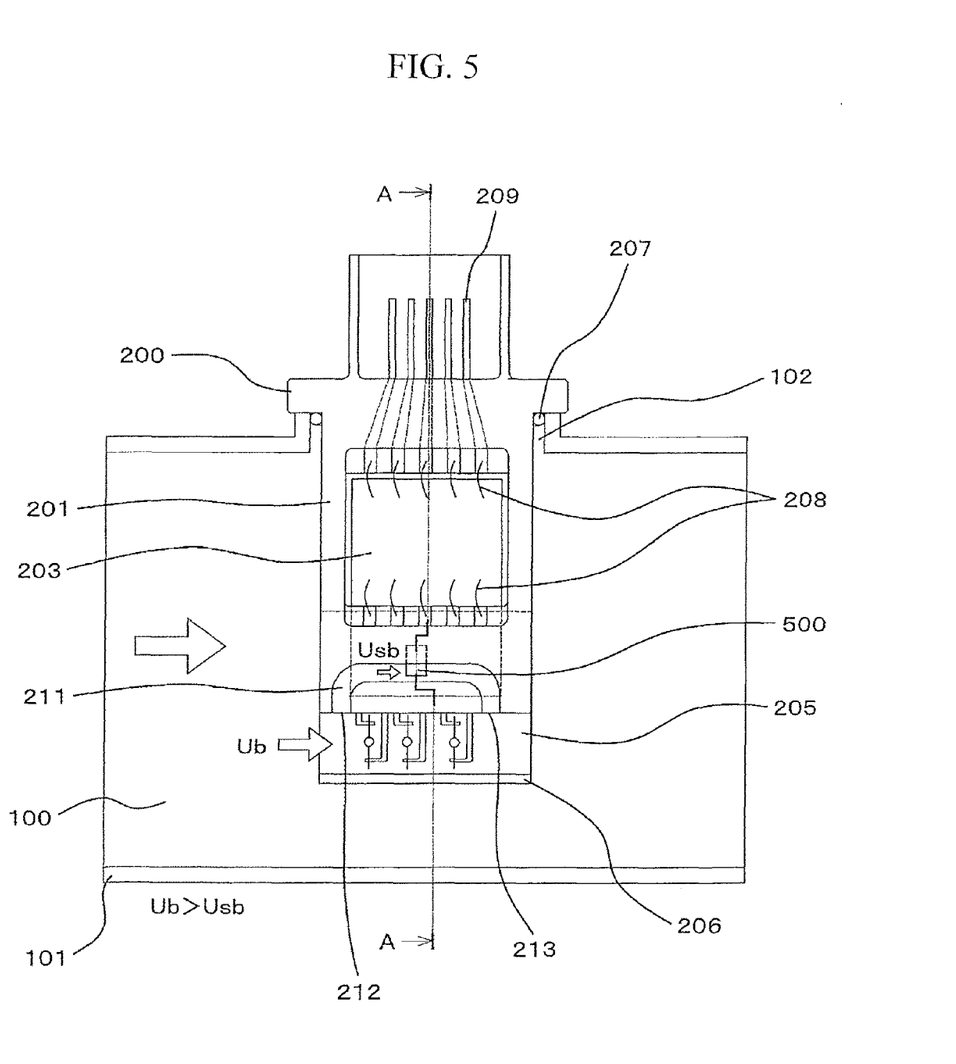
FIG. 5 is a diagram of a sensor structure showing still another embodiment of the present invention.

FIG. 5 shows an example in which the second bypass channel 211 is shaped to enhance the effect of heating the humidity sensing part 500.

The second bypass channel 211 is configured such that when the flow velocity Ub of air flowing through the bypass air passage 205 is compared with the flow velocity Ub of air flowing through the second bypass channel 211, a "Ub>Usb" relationship is established. In the present example, the second bypass inlet 212 and the second bypass outlet 213 are open in the bypass air passage 205 in the horizontal direction with respect to the direction in which air flows through the bypass air passage 205. This configuration suppresses heat radiation from the electronic circuit board 203 due to the air flowing through the second bypass channel 211. This enables an increase in the quantity of heat applied to the periphery of the humidity sensing part 500, thus allowing a "radiated heat<received heat" tendency to be enhanced. This is an advantageous solution for a situation in which removal of condensed dew from around the humidity sensing part 500 is given top priority.

Figure 6:
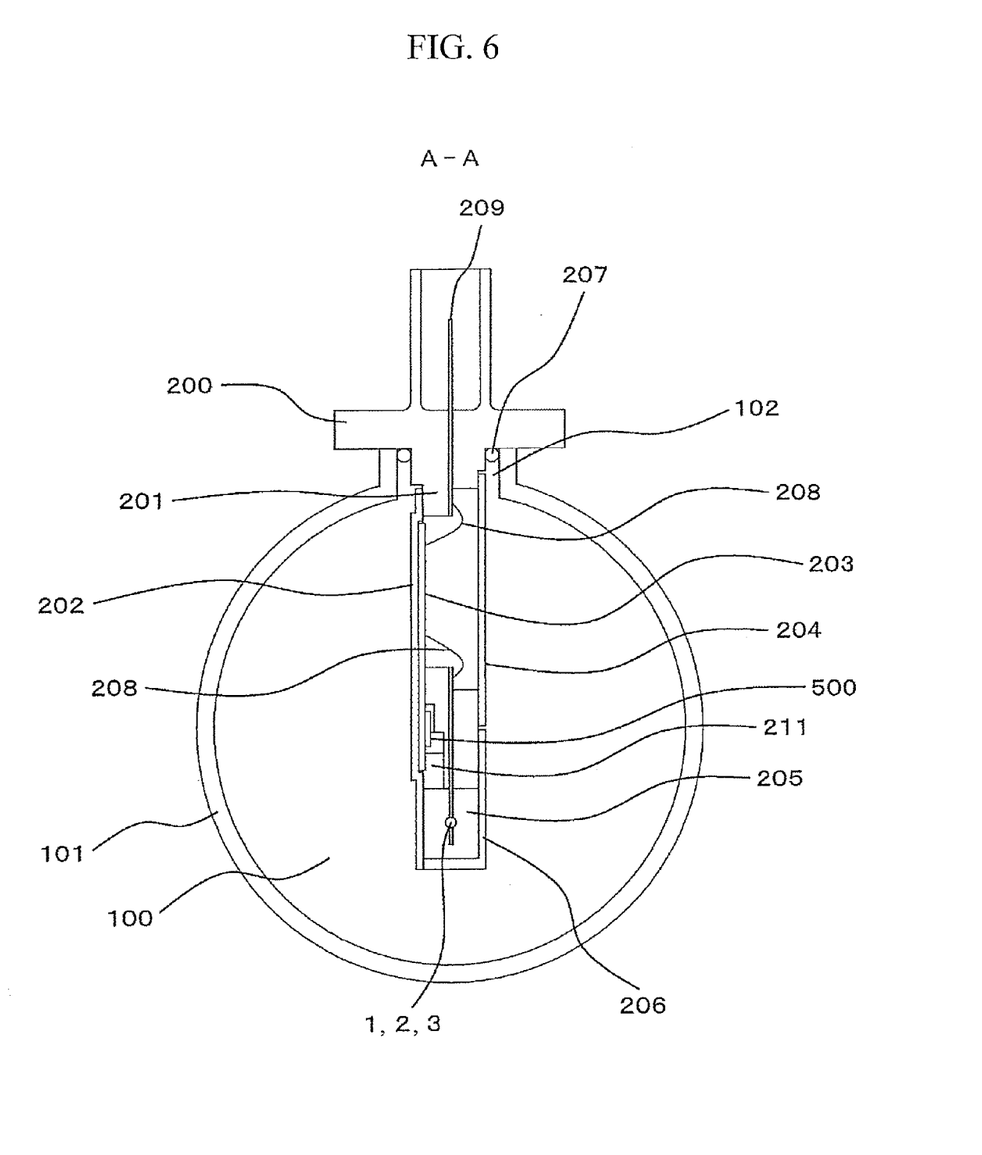
FIG. 6 is a sectional view taken along line A-A in FIG. 4.

FIG. 6 is a sectional view taken along line A-A in FIG. 5.

The second bypass channel 211 is constructed as follows: the electronic circuit board 203 is fixed on the base plate 202 by adhesion or the like, and the base plate 202 is assembled with a housing structural part 201 and a bypass channel 206 by adhesion or the like. A part of a wall forming the cross section of the second bypass channel 211 is formed using the electronic circuit board 203. Thus, air flowing through the second bypass channel 211 directly contacts the surfaces of the humidity sensing part 500 and the electronic circuit board 203.

Figure 7:
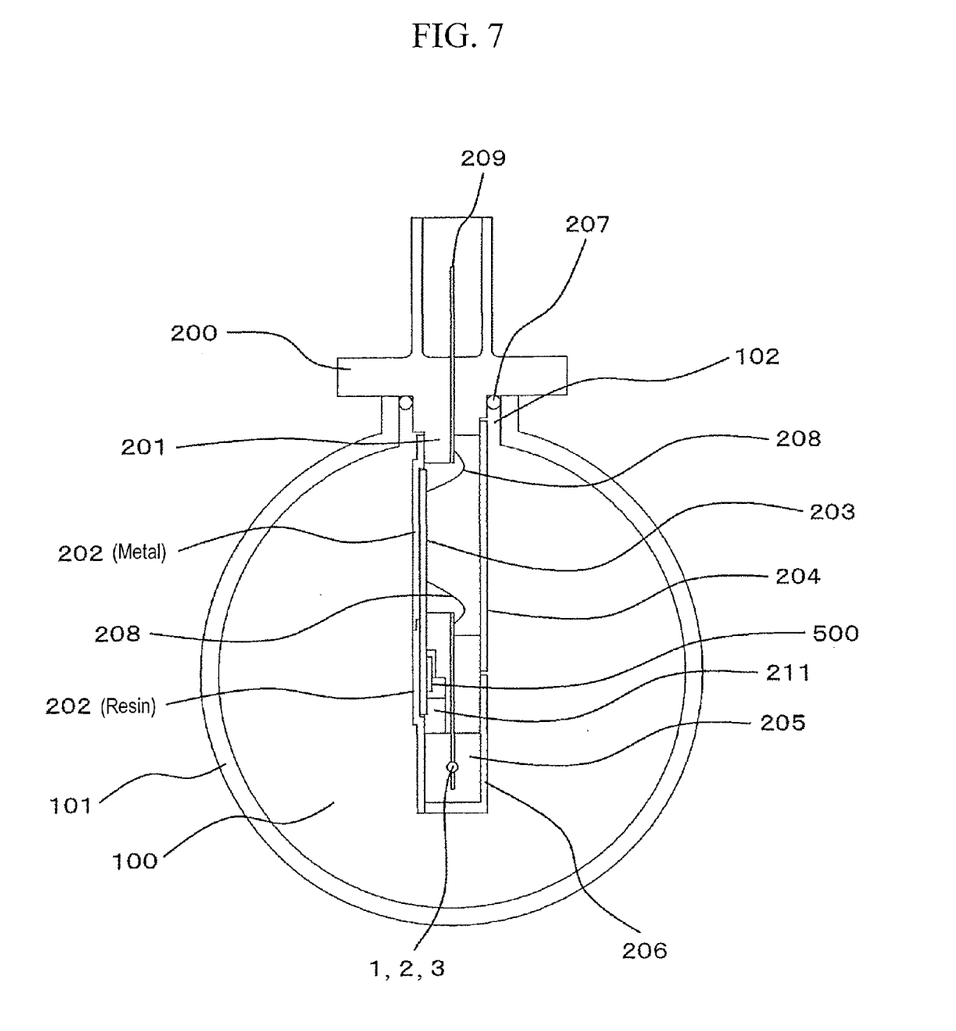
FIG. 7 is a diagram of a sensor structure showing further another embodiment of the present invention.

FIG. 7 shows an example corresponding to the structure in FIG. 6 in which the base plate 202 is composed of two types of materials.

The base plate 202 is composed of a metal material and a resin material. The metal material is used in a drive circuit side of the heating resistor type mass air flow measurement device 200 which involves a large quantity of self-heating. The resin material is used in areas in which the humidity sensing part 500 and the second bypass channel 211 are installed. Heat generated on the drive circuit side of the heating resistor type mass air flow measurement device 200 is radiated, from the metal material side, to the air flowing through the main air flow passage 100. The thermal effect is also transmitted from the drive circuit side of the heating resistor type mass air flow measurement device 200 through the electronic circuit substrate 203, and reaches the periphery of the humidity sensing part 500. Then, since the corresponding part of the base plate 202 is composed of the resin material, the radiation of the heat to the air is suppressed. This configuration enables the condensation in the humidity sensing part 500 to be recovered to normal environment in a short time. The configuration is advantageous if in connection with the balance between the heat radiation and the heating of the humidity sensing part 500, higher emphasis is placed on the heating.

However, even in this configuration, the velocity of air flowing through the bypass air passage 205 and the second bypass channel 211 also increases as the velocity of air flowing through the main air flow passage 100 increases. Thus, at a high flow velocity at which condensation is unlikely to occur, heat is expected to be radiated from the circuit board through the second bypass channel 211. At a high flow rate, efficient heat radiation can be achieved.

Figure 8:
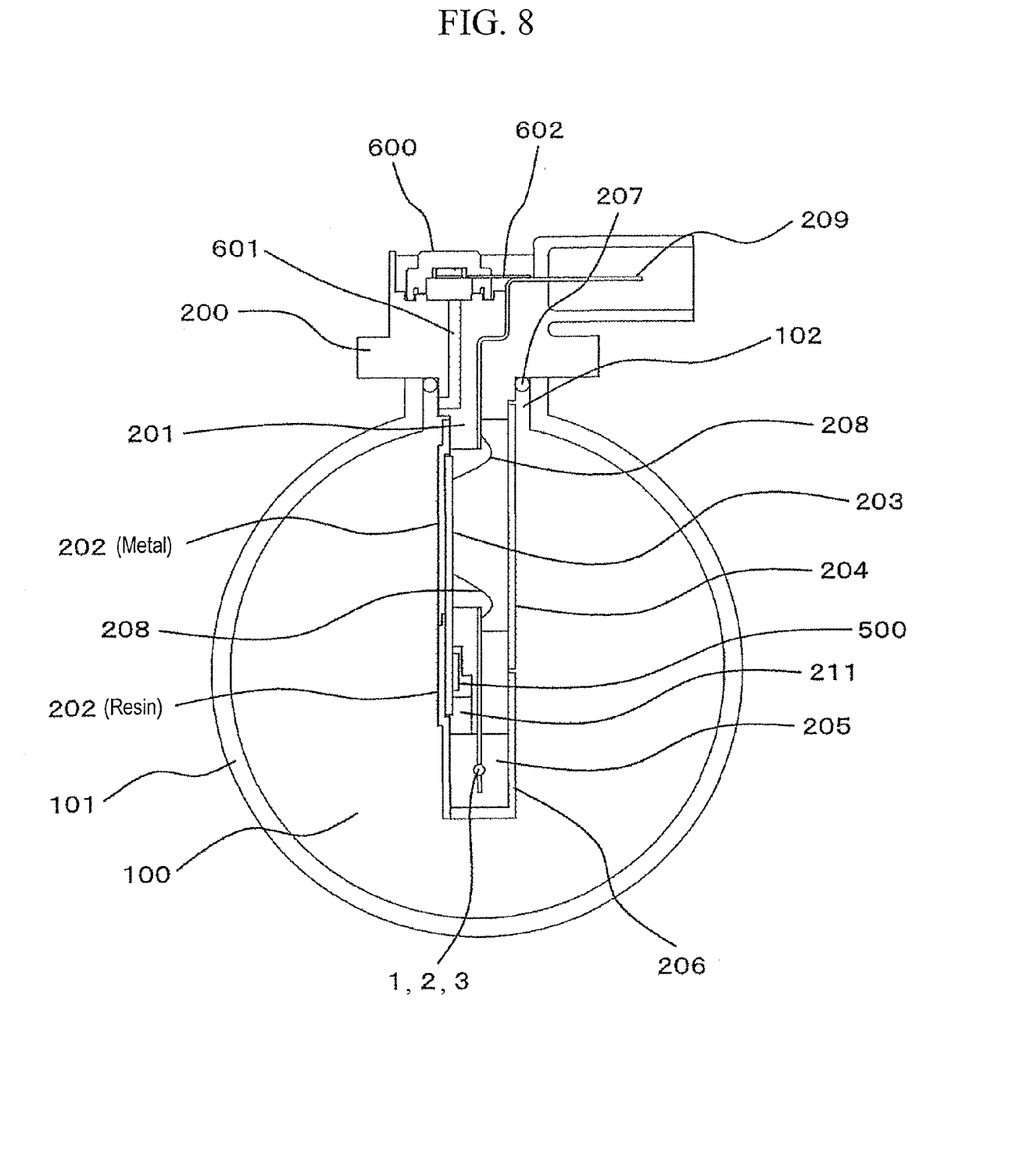
FIG. 8 is a diagram of a sensor structure showing further another embodiment of the present invention.

FIG. 8 shows an example in which the present invention is applied to a configuration in which a heating resistor type mass air flow measurement device 200, an intake air temperature sensor 3, and a humidity sensing part 500 as well as a pressure sensing part 600 are integrated together.

An air flow tube (intake line structural part) 101 included in a main air flow passage (hereinafter also referred to as an intake line or simply an intake tube) 100 includes a sensor installation opening 102 formed in a part of the air flow tube 101 and through which a part of the heating resistor type mass air flow measurement device 200 is inserted. The heating resistor type mass air flow measurement device 200 into which the humidity sensing part 500 is integrated is installed in the air flow tube 101.

The heating resistor type mass air flow measurement device 200 includes not only a housing structural part 201 but also a base plate 202, a cover 204 configured to protect an electronic circuit board 203, a heating resistor 1 to measure mass air flow, an air temp compensation resistor 2 used to measure the mass air flow, the intake air temperature sensor 3 used at a vehicle side, a bypass air passage 205 in which the heating resistor 1, the air temp compensation resistor 2, and the like are installed, a bypass channel 206 forming the bypass air passage 205, and a seal material 207 to seal the main air flow passage 101 from the exterior. Moreover, the pressure sensing part 600 is mounted on a part of the housing structural part 201 positioned outside the air flow tube 101. The pressure sensing part 600 measures the pressure inside the main air flow passage 100 via a pressure intake hole 601 formed in the housing structural part 201.

The heating resistor 1, air temp compensation resistor 2, and intake air temperature sensor 3 which are configured to sense intake mass air flow or intake air temperature are connected to the electronic circuit board 203 via a bonding material 208. Moreover, the electronic circuit board 203 is similarly electrically connected to a connector terminal 209 via the bonding material 208 so as to receive and output data from and to an external device via the connector terminal 209.

The humidity sensing part 500 is electrically connected to the connector terminal 209 from the electronic circuit board 203 via the bonding material 208 so as to receive and output data from and to the external device via the connector terminal 209.

The pressure sensing part 600 receives and outputs data to and from the external device via pressure measurement I/O terminals 602 and the connector terminal 209 by, for example, welding.

The humidity sensing part 500 is installed on the electronic circuit board 203 configured to drive the heating resistor type mass air flow measurement device 200, and is further mounted in the second bypass channel 211. The second bypass channel 211 is configured to bypass the bypass air passage 205. A second bypass inlet 212 and a second bypass outlet 213 are open in the bypass air passage 205 in the horizontal direction with respect to the direction in which air flows through the bypass air passage 205. Furthermore, a part of a wall forming the cross section of the second bypass channel 211 is formed using the electronic circuit board 203. Thus, air flowing through the second bypass channel 211 directly contacts the surfaces of the humidity sensing part 500 and the electronic circuit board 203.

Moreover, the base plate 202 is composed of a metal material and a resin material. The metal material is used on a drive circuit side of the heating resistor type mass air flow measurement device 200 which involves a large quantity of self-heating. The resin material is used in areas in which the humidity sensing part 500 and the second bypass channel 211 are installed. Heat generated on the drive circuit side of the heating resistor type mass air flow measurement device 200 is radiated, from the metal material side, to the air flowing through the main air flow passage 100. The thermal effect is also transmitted from the drive circuit side of the heating resistor type mass air flow measurement device 200 through the electronic circuit substrate 203, and reaches the periphery of the humidity sensing part 500. Then, since the corresponding part of the base plate 202 is composed of the resin material, the radiation of the heat to the air is suppressed.

The above-described configuration allows the heating resistor type mass air flow measurement device 200, the intake air temperature sensor 3, the pressure sensing part 600, and the humidity sensing part 500 to be integrated together. The resultant structure is unsusceptible to condensation and excellent in heat radiation from the electronic components, particularly in connection with humidity sensing.

Figure 9:
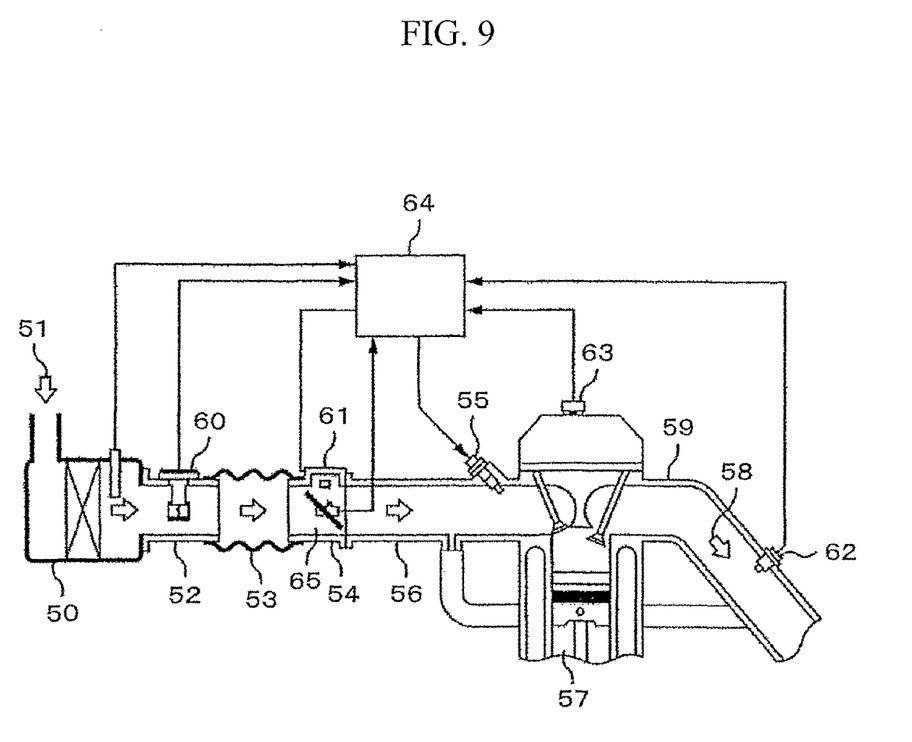
FIG. 9 is a schematic diagram of the system configuration of an internal combustion engine in which the present invention is used.

Finally, an example in which the article of the present invention is applied to an internal combustion engine based on an electronic fuel injection system will be described with reference to FIG. 9

Intake air 51 is sucked through an air cleaner 50 passes through a flow tube mass air flow sensor installed 52 into which the heating resistor type mass air flow measurement device 200 is inserted, an intake air duct 53, a throttle body 54, and an intake manifold 56 with an injector 55 to which fuel is supplied, and then enters an engine cylinder 57. On the other hand, exhaust gas 58 generated in the engine cylinder 57 is discharged via an exhaust manifold 59.

A control unit 64 receives a mass air flow signal, a humidity signal, a pressure signal, and a temperature signal output by an integrated bypass channel type mass air flow sensor module 60 of the heating resistor type mass air flow measurement device 200, a throttle valve angle signal output by a throttle angle sensor 61, an oxygen concentration signal output by an oxygen meter 62 provided in the exhaust manifold 59, an engine rotation speed signal output by an engine speed meter 63, and the like. The control unit 64 sequentially calculates these signals to determine the optimum fuel injection amount and idle air control valve opening degree. The control unit 64 then uses these values to control the injector 55 and an idle air control valve 65.

What is claimed is:
1. A sensor structure in which a mass air flow measurement device configured to measure intake mass air flow in an intake tube and a humidity sensing device configured to detect humidity in the intake tube are formed in an integrated manner, the sensor structure comprising:
- a bypass air passage through which part of air flowing through the intake tube is taken in;
- a mass air flow sensing element configured to detect the intake mass air flow and mounted inside the bypass air passage;
- a second bypass channel provided in addition to the bypass air passage;
- a humidity sensing element configured to come into direct contact with a portion of the intake air and mounted inside the second bypass channel;
- an electronic circuit board, on which the humidity sensing element and a drive circuit part of the humidity sensing element are mounted; and
- a base plate configured to hold the electronic circuit board through adhesion; wherein
- the base plate comprises a first base plate and a second base plate that has a greater heat conductivity rate than the first base plate;
- the base plate at a position where the humidity sensing element is mounted comprises the first base plate; and
- the base plate at a position where the drive circuit part is mounted comprises the second base plate.

2. The sensor structure according to claim 1, wherein the second bypass channel is installed so as to bypass a part of the bypass air passage in which the mass air flow sensing element is installed.

3. The sensor structure according to claim 2, wherein the second bypass channel branches off from the linearly configured bypass air passage in a perpendicular direction; and a relationship between the velocity of air flowing through the bypass air passage and the velocity of air flowing through the second bypass channel is such that the flow velocity in the bypass air passage is greater than the flow velocity in the second bypass channel.

4. The sensor structure according to claim 1, wherein the first base plate comprises resin, and the second base plate comprises metal.

5. The sensor structure according to claim 1, further comprising a pressure sensing part configured to detect a pressure inside the intake tube.

* * * * *